United States Patent
Kawahara et al.

(10) Patent No.: US 7,154,516 B2
(45) Date of Patent: Dec. 26, 2006

(54) IMAGE DISPLAY DEVICE

(75) Inventors: Isao Kawahara, Osaka (JP); Kazuhiro Yamada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 398 days.

(21) Appl. No.: 10/481,435

(22) PCT Filed: Apr. 23, 2003

(86) PCT No.: PCT/JP03/05180

§ 371 (c)(1),
(2), (4) Date: Dec. 22, 2003

(87) PCT Pub. No.: WO03/091975

PCT Pub. Date: Nov. 6, 2003

(65) Prior Publication Data

US 2004/0183820 A1    Sep. 23, 2004

(30) Foreign Application Priority Data

Apr. 24, 2002   (JP)   ............................. 2002-121928

(51) Int. Cl.
G09G 3/28   (2006.01)
(52) U.S. Cl. .......................................... 345/690; 345/63
(58) Field of Classification Search ................ 313/582, 313/584, 586, 574, 633; 315/169.1, 169.4; 345/60, 61, 62, 89, 63, 64, 65, 690; 348/455
See application file for complete search history.

(56) References Cited

U.S. PATENT DOCUMENTS

| | | | | |
|---|---|---|---|---|
| 6,466,187 B1 * | 10/2002 | Moon | .......................... | 345/63 |
| 6,882,115 B1 * | 4/2005 | Song | ....................... | 315/169.4 |
| 2002/0158820 A1 * | 10/2002 | Hoppenbrouwers | .......... | 345/60 |

FOREIGN PATENT DOCUMENTS

| | | |
|---|---|---|
| JP | 10-133623 | 5/1998 |
| JP | 11-212517 | 8/1999 |
| JP | 2000-276100 | 10/2000 |
| JP | 2001-51647 | 2/2001 |
| JP | 2001-83926 | 3/2001 |
| JP | 2001-92409 | 4/2001 |

* cited by examiner

Primary Examiner—Nitin Patel
(74) Attorney, Agent, or Firm—Wenderoth, Lind & Ponack, L.L.P.

(57) ABSTRACT

The image display device disclosed detects areas including grayscales with gradients and motions in an image signal and compensates the prescribed grayscales of the image signals to the other grayscales according to the motion amplitude and direction of the area, and the gradient amplitude and direction of the grayscale. Consequently, intermediate non-lit sub-fields causing the dynamic false contour are distributed to display image suppressing the dynamic false contour.

8 Claims, 17 Drawing Sheets

FIG. 3

| sub-field | SF3 | SF4 | SF5 | SF6 | SF7 | SF8 | SF9 | SF10 | SF11 | SF12 |
|---|---|---|---|---|---|---|---|---|---|---|
| WB | 4 | 8 | 12 | 20 | 24 | 28 | 32 | 36 | 40 | 48 |
| 0~3 | | | | | | | | | | |
| 4~7 | ● | | | | | | | | | |
| 8~11 | | ● | | | | | | | | |
| 12~15 | ● | ● | | | | | | | | |
| 16~19 | ● | | ● | | | | | | | |
| 20~23 | | ● | ● | | | | | | | |
| 24~27 | ● | ● | ● | | | | | | | |
| 28~31 | | ● | | ● | | | | | | |
| 32~35 | ● | ● | | ● | | | | | | |
| 36~39 | ● | | ● | ● | | | | | | |
| 40~43 | | ● | ● | ● | | | | | | |
| 44~47 | ● | ● | ● | ● | | | | | | |
| 48~51 | ● | ● | ● | | ● | | | | | |
| 52~55 | | ● | | ● | ● | | | | | |
| 56~59 | | | ● | ● | ● | | | | | |
| 60~63 | ● | | ● | ● | ● | | | | | |
| 64~67 | | ● | ● | ● | ● | | | | | |
| 68~71 | ● | ● | ● | ● | ● | | | | | |
| 72~75 | ● | ● | ● | ● | | ● | | | | |
| 76~79 | ● | ● | ● | | ● | ● | | | | |
| 80~83 | | ● | | ● | ● | ● | | | | |
| 84~87 | | | ● | ● | ● | ● | | | | |
| 88~91 | ● | | ● | ● | ● | ● | | | | |
| 92~95 | | ● | ● | ● | ● | ● | | | | |
| 96~99 | ● | ● | ● | ● | ● | | | | | |
| 100~103 | ● | ● | ● | ● | ● | | ● | | | |
| 104~107 | ● | ● | ● | ● | | ● | ● | | | |
| 108~111 | ● | ● | ● | | ● | ● | ● | | | |
| 112~115 | | ● | | ● | ● | ● | ● | | | |
| 116~119 | | | ● | ● | ● | ● | ● | | | |
| 120~123 | ● | | ● | ● | ● | ● | ● | | | |
| 124~127 | | ● | ● | ● | ● | ● | ● | | | |

FIG. 4

| sub-field | SF3 | SF4 | SF5 | SF6 | SF7 | SF8 | SF9 | SF10 | SF11 | SF12 |
|---|---|---|---|---|---|---|---|---|---|---|
| WB | 4 | 8 | 12 | 20 | 24 | 28 | 32 | 36 | 40 | 48 |
| 128~131 | ● | ● | ● | ● | ● | ● | ● |  |  |  |
| 132~135 | ● | ● | ● | ● | ● | ● |  | ● |  |  |
| 136~139 | ● | ● | ● | ● | ● |  | ● | ● |  |  |
| 140~143 | ● | ● | ● | ● |  | ● | ● | ● |  |  |
| 144~147 | ● | ● | ● |  | ● | ● | ● | ● |  |  |
| 148~151 |  | ● |  | ● | ● | ● | ● |  |  |  |
| 152~155 |  |  | ● | ● | ● | ● | ● | ● |  |  |
| 156~159 | ● |  | ● | ● | ● | ● | ● | ● |  |  |
| 160~163 |  | ● | ● | ● | ● | ● | ● | ● |  |  |
| 164~167 | ● | ● | ● | ● | ● | ● | ● | ● |  |  |
| 168~171 | ● | ● | ● | ● | ● | ● | ● |  | ● |  |
| 172~175 | ● | ● | ● | ● | ● | ● |  | ● | ● |  |
| 176~179 | ● | ● | ● | ● | ● |  | ● | ● | ● |  |
| 180~183 | ● | ● | ● | ● |  | ● | ● | ● | ● |  |
| 184~187 | ● | ● | ● |  | ● | ● | ● | ● | ● |  |
| 188~191 |  | ● |  | ● | ● | ● | ● | ● | ● |  |
| 192~195 | ● | ● |  | ● | ● | ● | ● | ● | ● |  |
| 196~199 | ● |  | ● | ● | ● | ● | ● | ● | ● |  |
| 200~203 |  | ● | ● | ● | ● | ● | ● | ● | ● |  |
| 204~207 | ● | ● | ● | ● | ● | ● | ● | ● | ● |  |
| 208~211 |  | ● | ● | ● | ● | ● | ● | ● |  | ● |
| 212~215 |  | ● | ● | ● | ● | ● |  |  | ● | ● |
| 216~219 |  | ● | ● | ● | ● | ● |  | ● | ● | ● |
| 220~223 |  | ● | ● | ● | ● |  | ● | ● | ● | ● |
| 224~227 |  | ● | ● | ● |  | ● | ● | ● | ● | ● |
| 228~231 |  | ● | ● |  | ● | ● | ● | ● | ● | ● |
| 232~235 | ● |  |  | ● | ● | ● | ● | ● | ● | ● |
| 236~239 |  | ● |  | ● | ● | ● | ● | ● | ● | ● |
| 240~243 | ● | ● |  | ● | ● | ● | ● | ● | ● | ● |
| 244~247 | ● |  | ● | ● | ● | ● | ● | ● | ● | ● |
| 248~251 |  | ● | ● | ● | ● | ● | ● | ● | ● | ● |
| 252~255 | ● | ● | ● | ● | ● | ● | ● | ● | ● | ● |

A

B grayscale 164 168 172 176 180 184 image position

FIG. 10A　　　　　FIG. 10B

| | | | | | | | | |
|---|---|---|---|---|---|---|---|---|
| 1 | 3/4 | 1 | 1 | 3/4 | 1 | 3/4 | 1 | 1/2 |
| 3/4 | 1 | 1 | 3/4 | 1 | 3/4 | 1 | 3/4 | 3/4 |
| 3/4 | 1 | 3/4 | 1 | 3/4 | 1 | 3/4 | 1 | 3/4 |
| 1 | 1 | 3/4 | 3/4 | 1 | 3/4 | 1 | 3/4 | 1 |
| 3/4 | 3/4 | 3/4 | 1 | 3/4 | 1 | 3/4 | 1 | 1 |
| 3/4 | 1 | 3/4 | 3/4 | 1 | 3/4 | 1 | 1 | 1 |
| 3/4 | 3/4 | 3/4 | 1 | 3/4 | 1 | 1 | 1 | 1 |
| 1/2 | 1 | 3/4 | 3/4 | 1 | 1 | 1 | 3/4 | 1/4 |
| 1/2 | 3/4 | 3/4 | 1 | 1 | 1 | 3/4 | 1 | 1/4 |
| 1/4 | 1 | 3/4 | 1 | 1 | 1 | 3/4 | 1 | 1/2 |

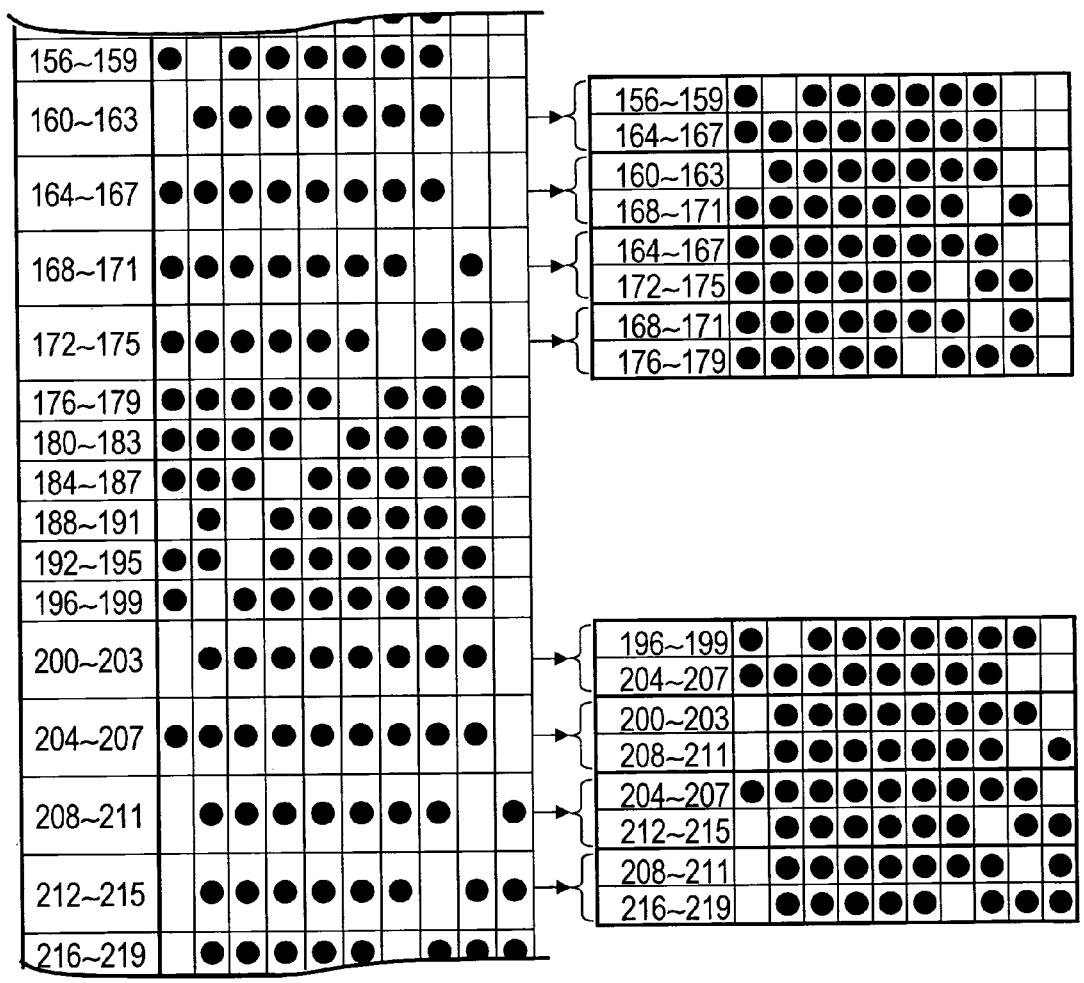

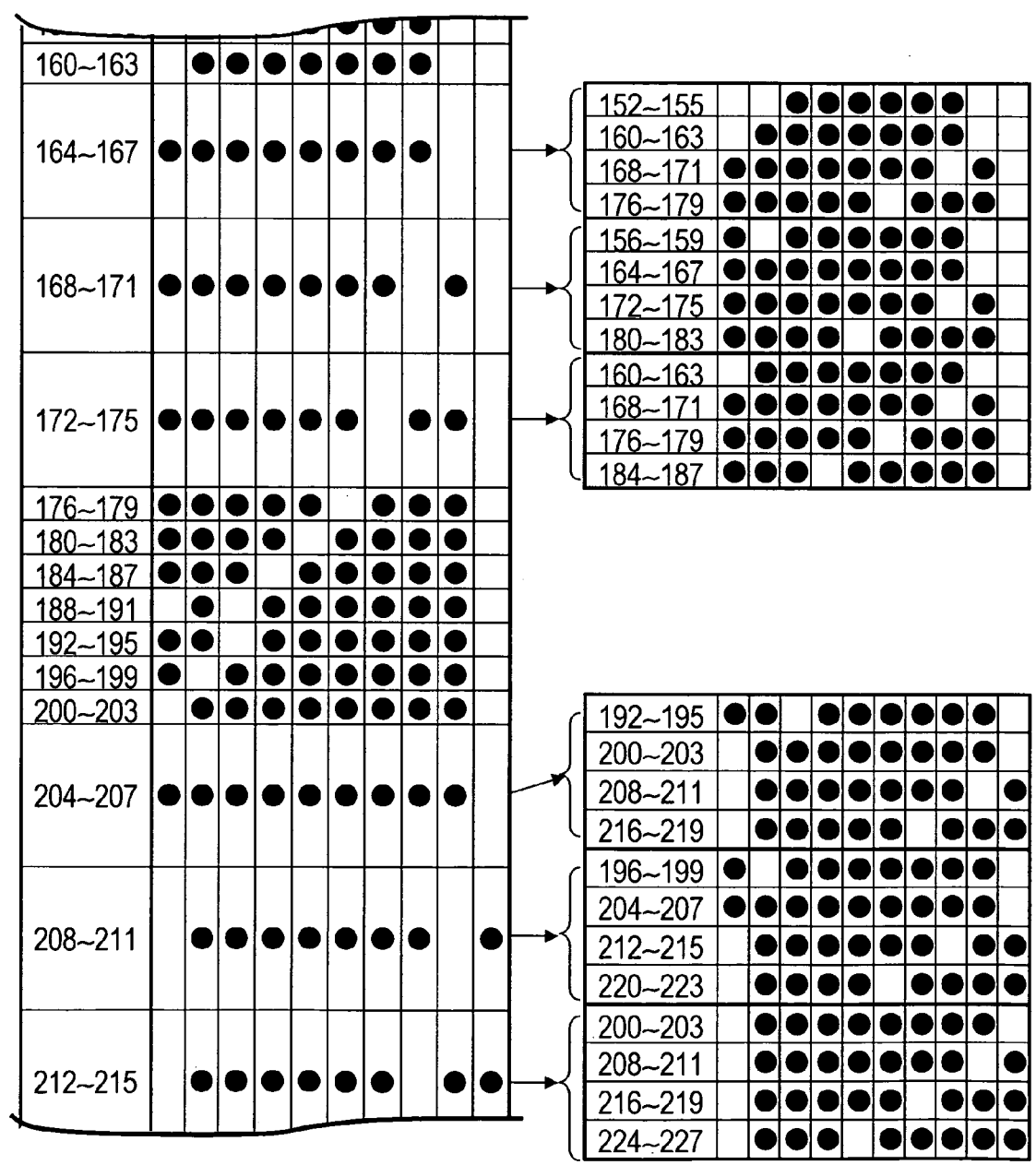

FIG. 16

|  | amplitudes of gradient | |
| --- | --- | --- |
|  | small | large |
| motion for low grayscale direction | pattern 1 | pattern 2 |
| motion for high grayscale direction | pattern 3 | pattern 4 |

(direction of motion)

IMAGE DISPLAY DEVICE

TECHNICAL FIELD

The present invention is generally related to the field of image display devices, more specifically the present invention is related to the field of plasma display panels (hereafter referred to as PDP) or the like which use sub-field organization to display images.

BACKGROUND ART

In general, the picture quality failures or picture noises of so-called dynamic false contour is likely to be perceived in moving images shown on image display devices such as PDP or the like that utilizes the sub-field (SF) to display grayscales. Dynamic false contour occurs as a result of a discontinuous lighting pattern transition of SFs compound with the desired continuous lighting pattern of grayscales. Increasing the number of SFs contained within a field is known to improve the dynamic false contour. However, the increased number of SFs will reduce the period of time of lighting causing and undesirable brightness level.

To solve the problem, an example is disclosed to restrict the combinations of SFs in a moving image area, limiting the increase of SFs within not so many numbers, to suppress the dynamic false contour (for example, see Japanese Patent Unexamined Publication No. 2000-276100). Conventional display devices are capable of reducing dynamic false contour in the moving image area by restricting the combination of grayscales. However, this reduction of the number of grayscales degrades picture quality because false grayscales are created by the dithering process for the purpose of maintaining a certain overall level of grayscale. Accordingly, the additional grayscales created by the dithering process as an attempt to reduce dynamic false contours causes a degradation in picture quality, To solve this problem, the present invention aims to provide an image display device capable of suppressing the dynamic false contour while maintaining a good grayscale display.

DISCLOSURE OF THE INVENTION

To solve the above mentioned problems the image display device disclosed comprises a grayscale compensator operable to compensate the prescribed grayscale of the image signal to an another grayscale, wherein the grayscale compensator selects one of a plurality of compensation grayscales for respective prescribed grayscales.

BRIEF DESCRIPTION OF THE DRAWINGS

FIG. 3 shows a combination between displayed grayscale and sub-field (SF) to be lit to display the grayscale in exemplary embodiment 1 to 5 of the present invention in grayscale ranging from 0 to 127.

FIG. 4 shows a combination between displayed grayscale and sub-field (SF) to be lit to display the grayscale in exemplary embodiment 1 to 5 of the present invention in grayscale ranging from 128 to 255.

FIG. 10 shows average lighting probabilities of respective sub-fields with respect to respective grayscales for the image display device used in exemplary embodiment 2 of the present invention.

FIG. 11 shows compensation patterns for the grayscale compensator used in exemplary embodiment 3 of the present invention.

FIG. 13 shows compensation patterns for the grayscale compensator used in exemplary embodiment 4 of the present invention.

FIG. 16 shows relations between compensation patterns determined by the grayscale compensator and the amplitude of the gradient with respect to the motion directions used in exemplary embodiment 5 of the present invention.

DETAILED DESCRIPTIONS OF THE PREFERRED EMBODIMENTS

The image display device used in exemplary embodiment 1 of the present invention is described with reference to the drawings.

Exemplary Embodiment 1

Figure 1:
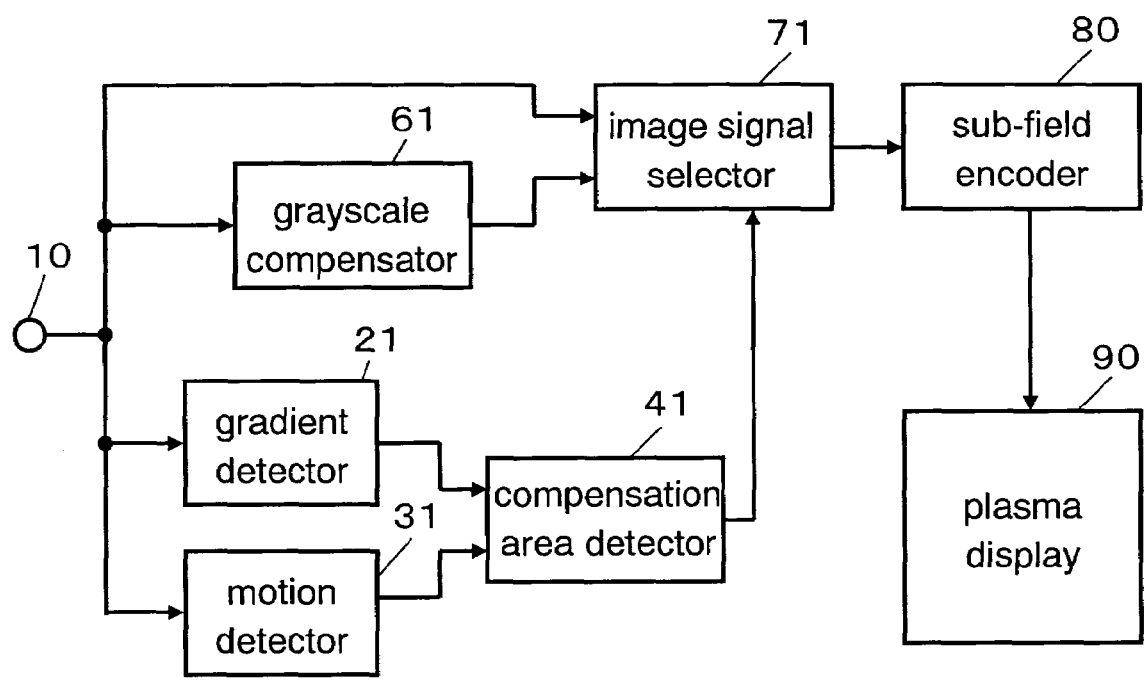
FIG. 1 shows a block diagram of a circuit for the image display device used in exemplary embodiment 1 of the present invention.

FIG. 1 shows a block diagram of a circuit for the image display device used in exemplary embodiment 1. Gradient detector 21 detects areas having grayscale gradient (hereafter referred to as grayscale gradient area) in the images of image signal 10. Motion detector 31 detects moving areas in the images of image signal 10. Compensation area detector 41 detects moving grayscale gradient areas as areas for the compensation using the outputs produced by gradient detector 21 and motion detector 31. Grayscale compensator 61 modifies the prescribed grayscale of image signal 10 to another grayscale by adding compensation value on image signal 10.

Image signal selector 71 selects the output of grayscale compensator 61 in moving grayscale gradient areas, and selects image signal 10 in other areas. Converting outputs of image signal selector 71 into SF signals, SF encoder 80 feeds the signals to display 90.

Figure 2:
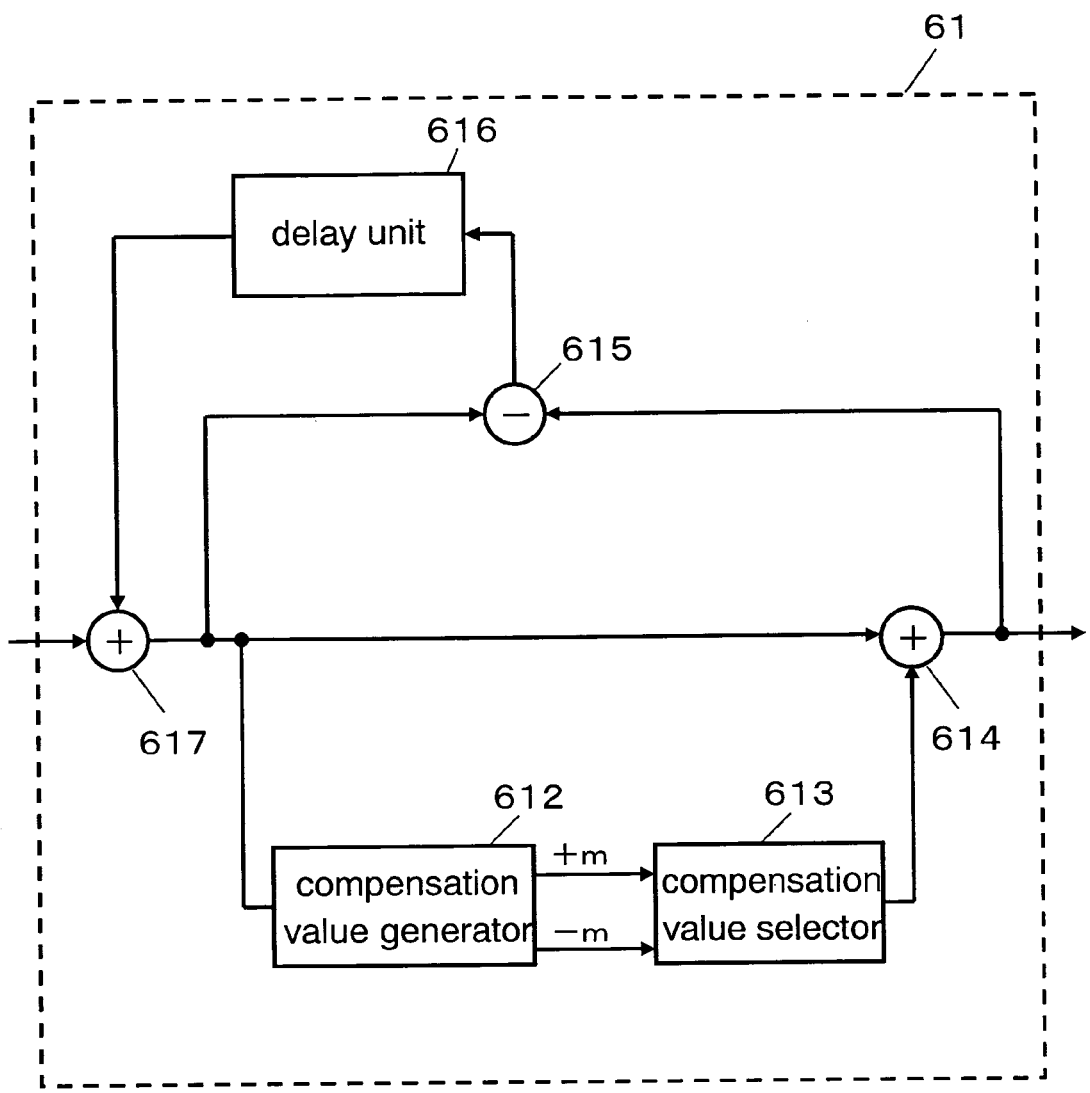
FIG. 2 shows a block diagram of a circuit for the grayscale compensator of the image display device used in exemplary embodiment 1 of the present invention.

FIG. 2 shows a block diagram of a circuit for the grayscale compensator of the image display device used in exemplary embodiment 1 of the present invention. Compensation value generator 612 generates compensation values −m and +m for respective grayscales of an image signal. Compensation value selector 613 selects the two compensation values alternately or at random by pixels and by lines. Adder 614 converts prescribed image signal into compensated grayscales to output as a compensated image signals by adding outputs of compensation value selector 613 to image signals. The average of the compensated grayscales is equal to grayscales before compensation because added compensation values are −m and +m, and the average of compensated image signals is not changed by the compensation because compensation value selector 613 selects the two compensation values alternately or at random by pixels and by lines.

Calculating differences between image signals before compensation and the compensated image signals, subtractor 615 adds the signal differences to input signals through adder 617, after being delayed by the prescribed delay unit 616. Such feedback circuitry used as a grayscale compensator can make a false modification on grayscale error accompanied by the grayscale compensation because average grayscales including surrounding pixels can be brought close to the grayscales before compensation.

Next, operation of the image display device in accordance with exemplary embodiment 1 is described. In this exemplary embodiment, one field consists of 12 sub-fields (SF1, SF2, . . . and SF12), having weighed brightness (WB) of (1, 2, 4, 8, 12, 20, 24, 28, 32, 36, 40, and 48) respectively.

FIGS. 3 and 4 show the combinations between displayed grayscales and lighting sub-fields to display the grayscales, FIG. 3 for grayscale ranging from 0 to 127 and FIG. 4 for grayscale ranging from 128 to 255. Here, the SF denoted by • mark means an ON or lit sub-field. SFs having low order WB of 2-bits (SF1 and SF2) are omitted for better understanding of the illustrations.

Usually, grayscales of input image signals are displayed according to the SF combinations. In some cases, however, a strong dynamic false contour occurs in a moving grayscale gradient area if the SF combinations are used without any modification.

Our study on the dynamic false contour found that non-lit SFs having weighed brightness (WB) lower than highest WB of the lit SF (hereafter referred to as an intermediate non-lit SF) among SFs composing one field contributes mainly to the dynamic false contour caused by the combinations of grayscale gradients and image motions. Particularly the non-lit SF with the highest WB among the intermediate non-lit SFs (hereafter referred to as the highest intermediate non-lit SF) plays the main role in creating the dynamic false contour.

Figure 5A:
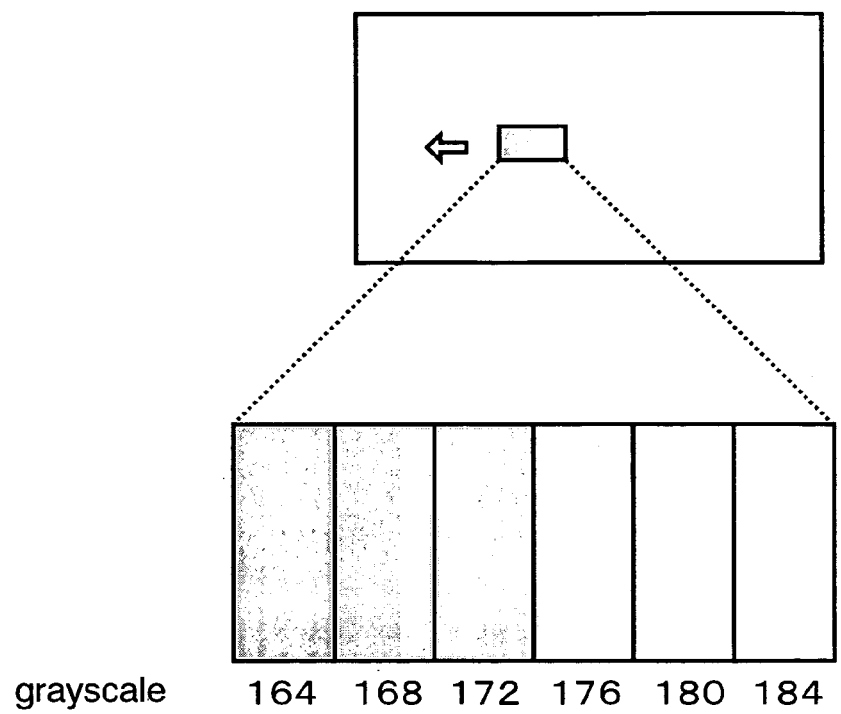
FIG. 5 shows an illustration explaining why the false contour effect occurs in a moving grayscale gradient area.
Figure 5B:
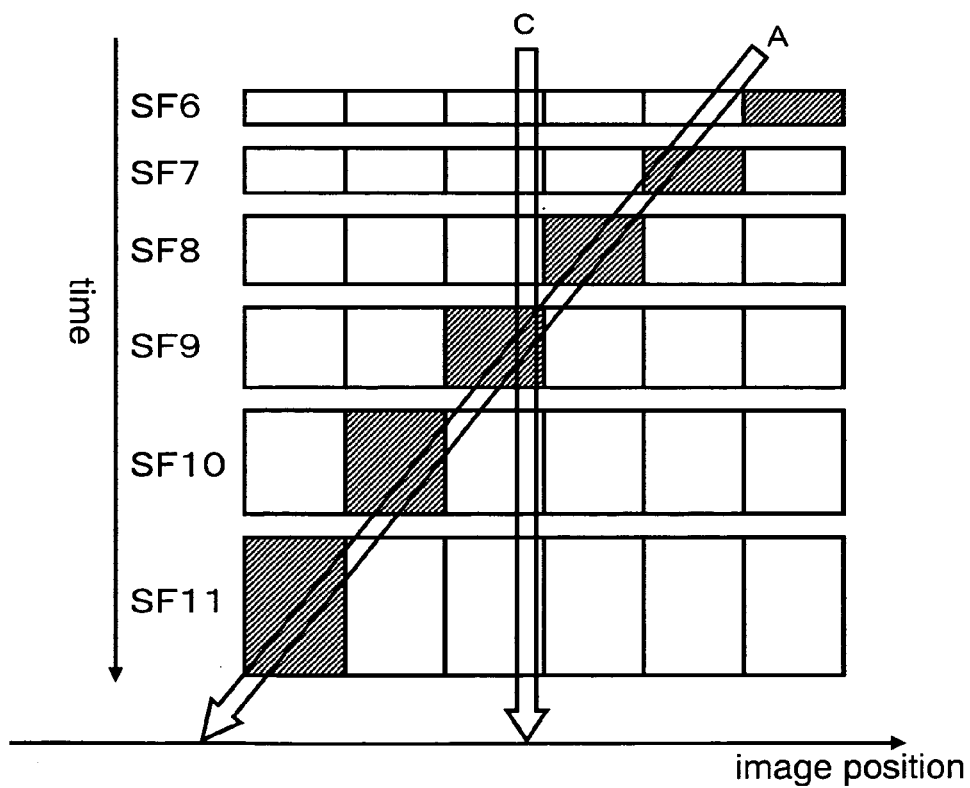

The reason why the dynamic false contour occurs in moving grayscale gradient areas will be explained below. FIG. 5 is an illustration explaining why the dynamic false contour occurs in moving grayscale gradient areas. As shown in FIG. 5A, let us assume for example a moving image to the left direction with a grayscale gradient area having a grayscale ranging from approximately 164 to 184 showing a darker shaded area in the left hand side and a lighter shaded area in the right hand side of the gradient area. FIG. 5B shows an exploded view of the afore-mentioned grayscale gradient area into the sub-fields, the X axis represents the image movement in a horizontal direction, and the Y axis represents elapsed time. To understand the illustration better only six SFs (SF6, SF7, . . . and SF11) are shown here. Hatchings in the drawing denote non-lit SFs. When the grayscale gradient area is in a stationary state the human eye can have the impression of right grayscale as human visual perception stands still on the image as indicated by arrow C. However, when the grayscale gradient area is moving to the left human visual perception moves to the left as well. Accordingly, the human visual perception will trace the highest intermediate non-lit SF at the points indicated by arrow A to perceive the impression of a strong dark line in the grayscale gradient area. Additionally, arrows A in FIG. 4 as well as in FIG. 5B denote the motion of human visual perception.

Through the aforementioned discussion, one can understand that a strong dynamic false contour occurs when the human visual perception moves at a speed to trace the intermediate non-lit SFs in grayscale gradient areas. In the example mentioned above, a dark line of the false contour is perceived when the human visual perception moves at a speed of passing from SF6 to SF11 during the grayscale increase from 164 to 184 to recognize the highest intermediate non-lit SF continuously.

On the contrary, occurring areas of the false contour can be predicted beforehand if position, amplitude of gradient, and moving distance of the grayscale gradient area of an image are known.

Figures 6A, 6B:
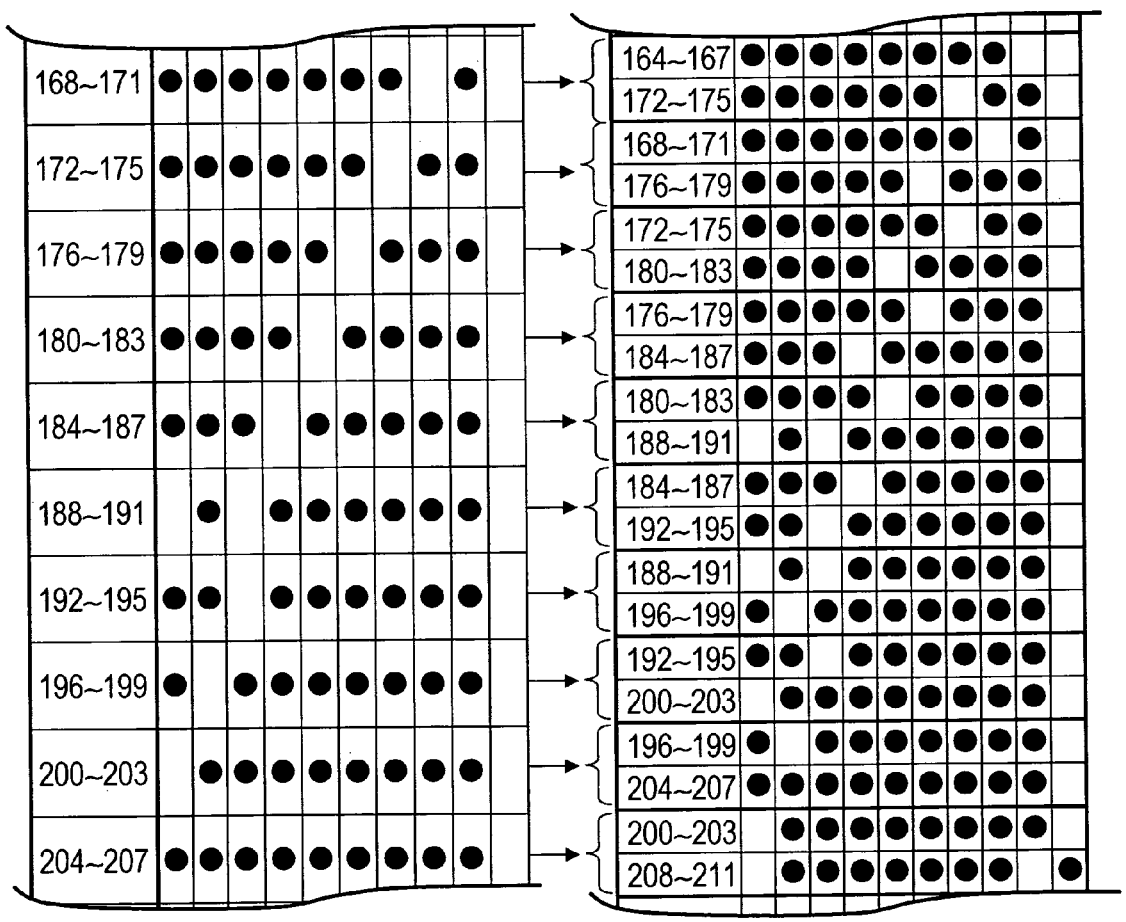
FIG. 6 shows compensation patterns for the grayscale compensator used in exemplary embodiment 1 of the present invention.

FIG. 6 shows compensation patterns for grayscale compensator 61 used in exemplary embodiment 1, FIG. 6A shows the relation between grayscales before compensation and lit SFs, FIG. 6B shows the relation between grayscales after compensation and lit SFs. To explain the illustration, FIG. 6 shows grayscale ranging only from 168 to 207. Grayscale compensator 61 compensates the grayscale to light the highest intermediate non-lit sub-field (SF) before compensation and, in turn of the compensation, converts the front and back SFs to non-lit SF with a probability of ½. Namely, the highest intermediate non-lit SF that causes the dynamic false contour is distributed into the front and back SFs by the compensation to light the highest intermediate non-lit SF of the grayscale. A signal having a grayscale of 168 for instance is converted into two compensated grayscales of 164 and 172 by adding two compensation values of −m=−4 and +m=+4, then is selected to output alternately by pixels and by lines. In this case, the original grayscale of 168, though once compensated into one of the compensated grayscales of 164 and 172, can keep the original value in average, because each has the compensation probability of ½.

Figures 7A, 7B:
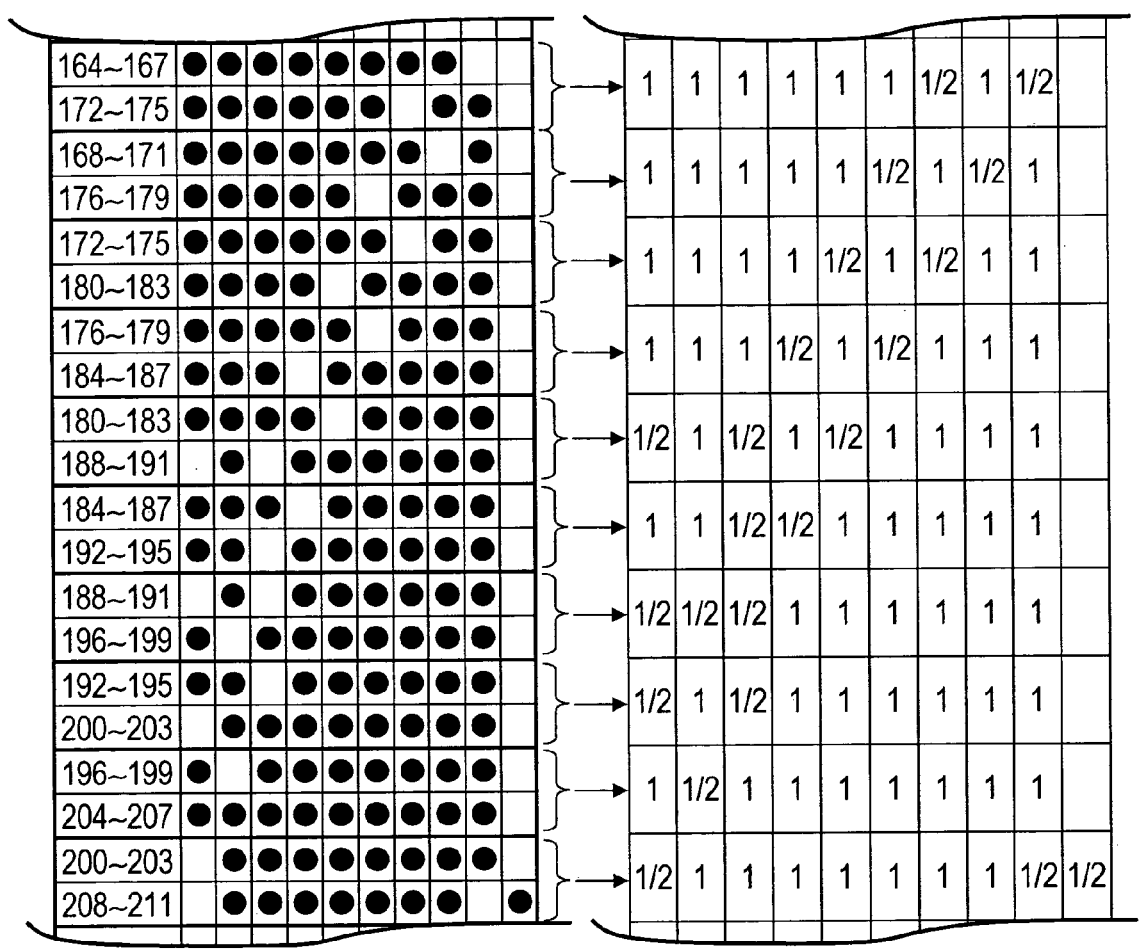
FIG. 7 shows average lighting probabilities of respective sub-fields with respect to respective grayscales in exemplary embodiment 1 of the present invention.

FIG. 7B shows an average lighting probability of respective SFs with respect to respective grayscales of the image display device in exemplary embodiment 1. Numbers in respective columns denote lighting probabilities after compensation such that "1" and "½" represents probabilities of 1 and ½, respectively and a blank column represents a probability of 0.

A signal with a grayscale of "168" for instance has the highest intermediate non-lit sub-field of SF10 before compensation and its lighting probability of 0. However, the picture quality is improved after compensation because the intermediate non-lit SFs are distributed into SF9 and SF11 with the lighting probabilities of ½ and the dynamic false contour in the compensation area is distributed as well. Here, FIG. 7A is identical to FIG. 6B.

As mentioned above, the dynamic false contour is likely to occur due to the presence of many intermediate non-lit SFs or the highest intermediate non-lit SF with a high WB in a specific area determined by the gradient of grayscales and its motion.

The image display device disclosed in exemplary embodiment 1, therefore, can suppress the occurrence of the dynamic false contour because the compensation areas are selected according to the gradient and motion of the grayscale, and the grayscale is compensated to distribute intermediate non-lit SFs especially the highest intermediate non-lit SF that causes the dynamic false contour in the area to the surrounding SFs.

Exemplary Embodiment 2

The concept of the image display device used in exemplary embodiment 2 to distribute intermediate non-lit SFs that causes the dynamic false contour to the surrounding SFs is identical to the concept of exemplary embodiment 1. Different from exemplary embodiment 1, however, the grayscale compensator distributes the highest intermediate non-lit SF to a broader range than that in exemplary embodiment 1, and provides the SFs with a higher lighting probability.

Figure 8:
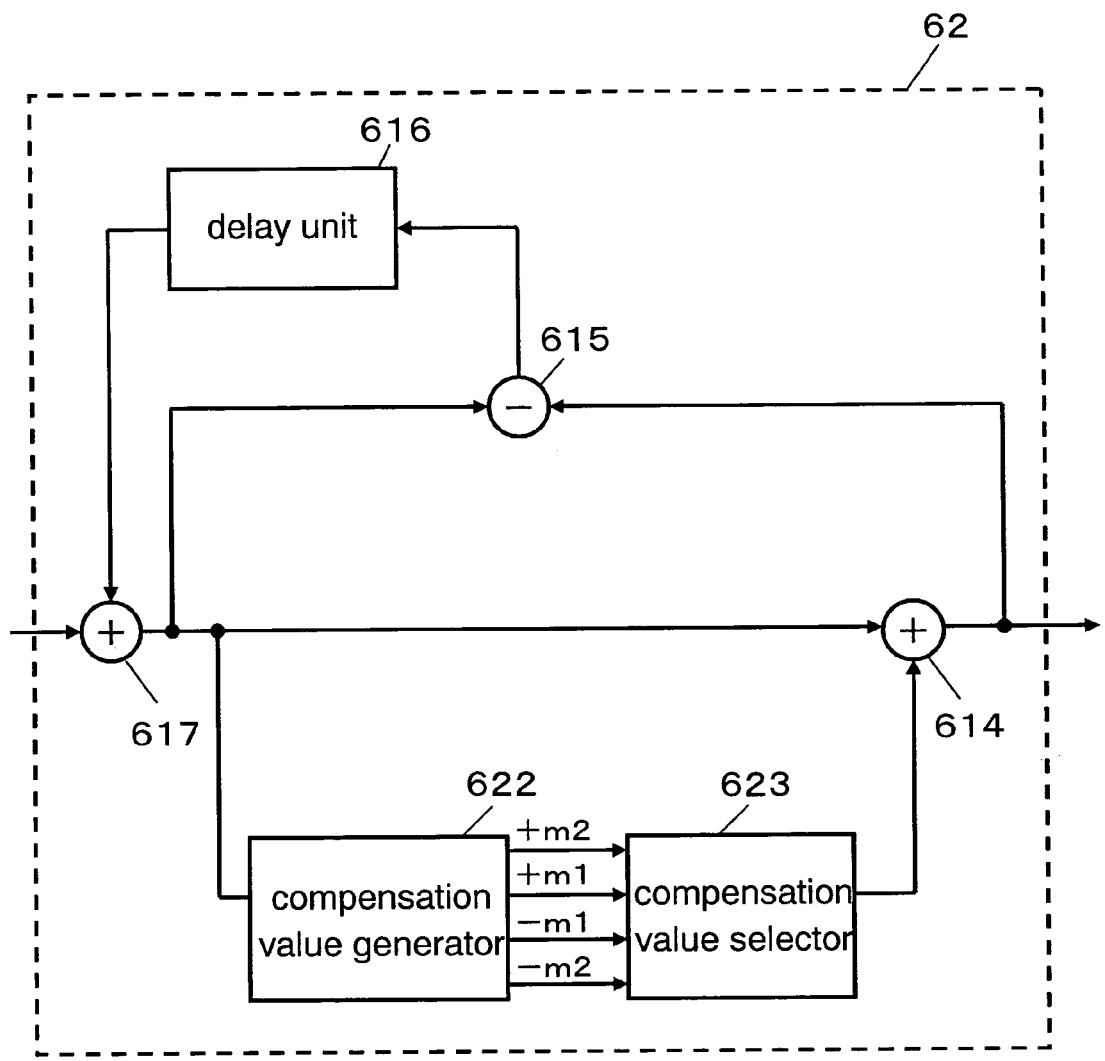
FIG. 8 shows a block diagram of a circuit for the grayscale compensator of the image display device used in exemplary embodiment 2 of the present invention.

FIG. 8 shows a block diagram of a circuit for grayscale compensator 62 of the image display device used in exemplary embodiment 2 of the present invention. Different from exemplary embodiment 1, compensation value generator 622 generates four compensation values of −m2, −m1, +m1 and +m2 for respective grayscales, and compensation value selector 623 selects these four compensation values alternately or at random by pixels and by lines.

The block diagram of a circuit for the image display device used in exemplary embodiment 2 is shown in FIG. 1 in which grayscale compensator 61 is replaced by grayscale compensator 62 shown in FIG. 8.

Figures 9A, 9B:
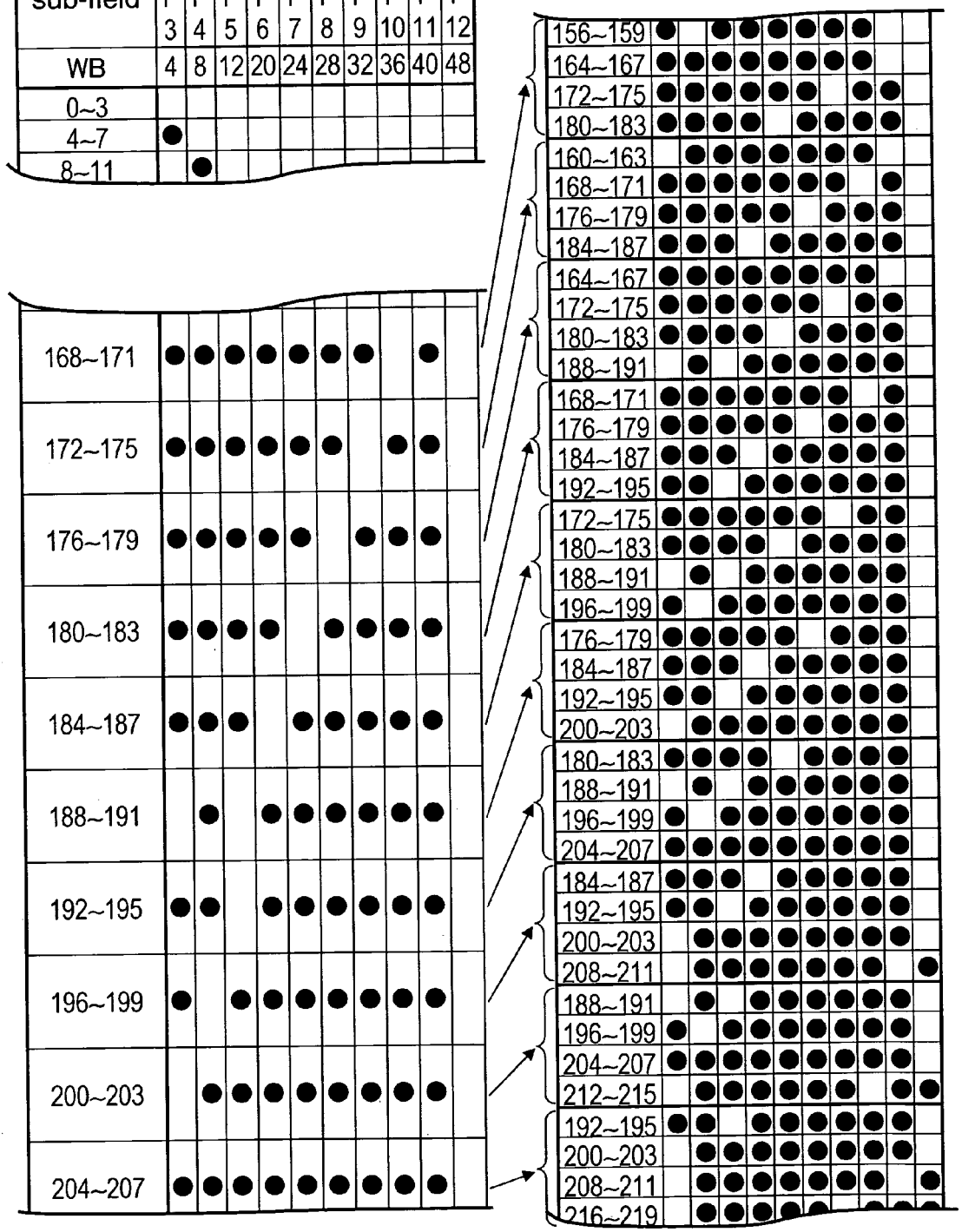
FIG. 9 shows compensation patterns for the grayscale compensator used in exemplary embodiment 2 of the present invention.

FIG. 9 shows compensation patterns for grayscale compensator 62 used in exemplary embodiment 2, FIG. 9A shows the relation between grayscales before compensation and lighting sub-field (SF), and FIG. 9B shows the relation between grayscales after compensation and lighting SF. FIG. 9 shows lighting SF combinations for the grayscale ranging from "168" to "207" only.

An image signal with grayscale "168", for instance, is converted into four compensated grayscales of "156", "164", "172" and "180" by adding four compensation values of −m2=−12, −m1=−4, +m1=+4 and +m2=+12 respectively, and are then selected to output alternately or at random by pixels and by lines. In this case, the original grayscales are kept unchanged in average of compensated grayscales.

FIG. 10 shows average lighting probabilities of respective SFs with respect to respective grayscales for the image display device used in exemplary embodiment 2. Numbers in respective columns denote lighting probabilities after compensation such that "1", "¾", "½" and "¼" represent probabilities of 1, ¾, ½ and ¼ respectively, and a blank column represents a probability of 0.

An image signal with a grayscale of "168" for instance has an intermediate non-lit SF of SF10 before compensation with the lighting probability of 0. However, the intermediate non-lit SFs are distributed to SF4, SF7, SF9 and SF11 with the lighting probabilities of ¾, ¾, ¾ and ½ respectively, and the dynamic false contour in the moving grayscale gradient area is distributed in a broader range as well resulting the improved picture quality after compensation. Here, FIG. 10A is identical to FIG. 9B.

As mentioned above, the image display device used in exemplary embodiment 2 can suppress the dynamic false contour more effectively than that in exemplary embodiment 1 because the intermediate non-lit SFs that causes the dynamic false contour are distributed to a broader range of SFs and provides the SFs with higher lighting probabilities.

Exemplary Embodiment 3

The concept of the image display device used in exemplary embodiment 3 to distribute intermediate non-lit SFs that causes the dynamic false contour to surrounding SFs is identical to the concept of exemplary embodiment 1. Different from exemplary embodiment 1, however, grayscale compensation is restricted to the grayscale including intermediate non-lit sub-field (SF) with a high weighed brightness (WB) or the surrounding grayscale including lit SF with the highest WB that shifts up to a higher order SF.

FIG. 11 shows compensation patterns for the grayscale compensator used in exemplary embodiment 3, FIG. 11A shows the relation between grayscales before compensation and lighting SF, and FIG. 11B shows the relation between grayscales after compensation and lighting SF. FIG. 11 shows lighting SF combinations for the grayscale ranging from "156" to "219" only.

As shown in FIG. 11A, grayscale "168" for instance includes the highest intermediate non-lit sub-field SF10 having a high WB, and at the same time lit SF having the highest WB is selected from SF10 to SF11 in upper grayscale level. The highest intermediate non-lit sub-field SF11 having a high WB exists in grayscale "208", and at the same time, bordering the grayscale, lit SF having the highest WB is selected from SF11 to SF12. In exemplary embodiment 3, only the grayscales in four columns including the grayscale are compensated as the surrounding grayscales. Namely, grayscale compensation is carried out for values from "160" to "175" and from "200" to "215" only but not from "176" to "199" as shown in FIG. 11B.

FIG. 12 shows average lighting probabilities of respective SFs with respect to respective grayscales for the image display device used in exemplary embodiment 3. The highest intermediate non-lit SF of the grayscales ranging from "168" to "171" and from "208" to "211" that are likely to occur a strong dynamic false contour due to the high WB is distributed to surrounding grayscales with increased lighting probabilities.

Figures 12A, 12B:
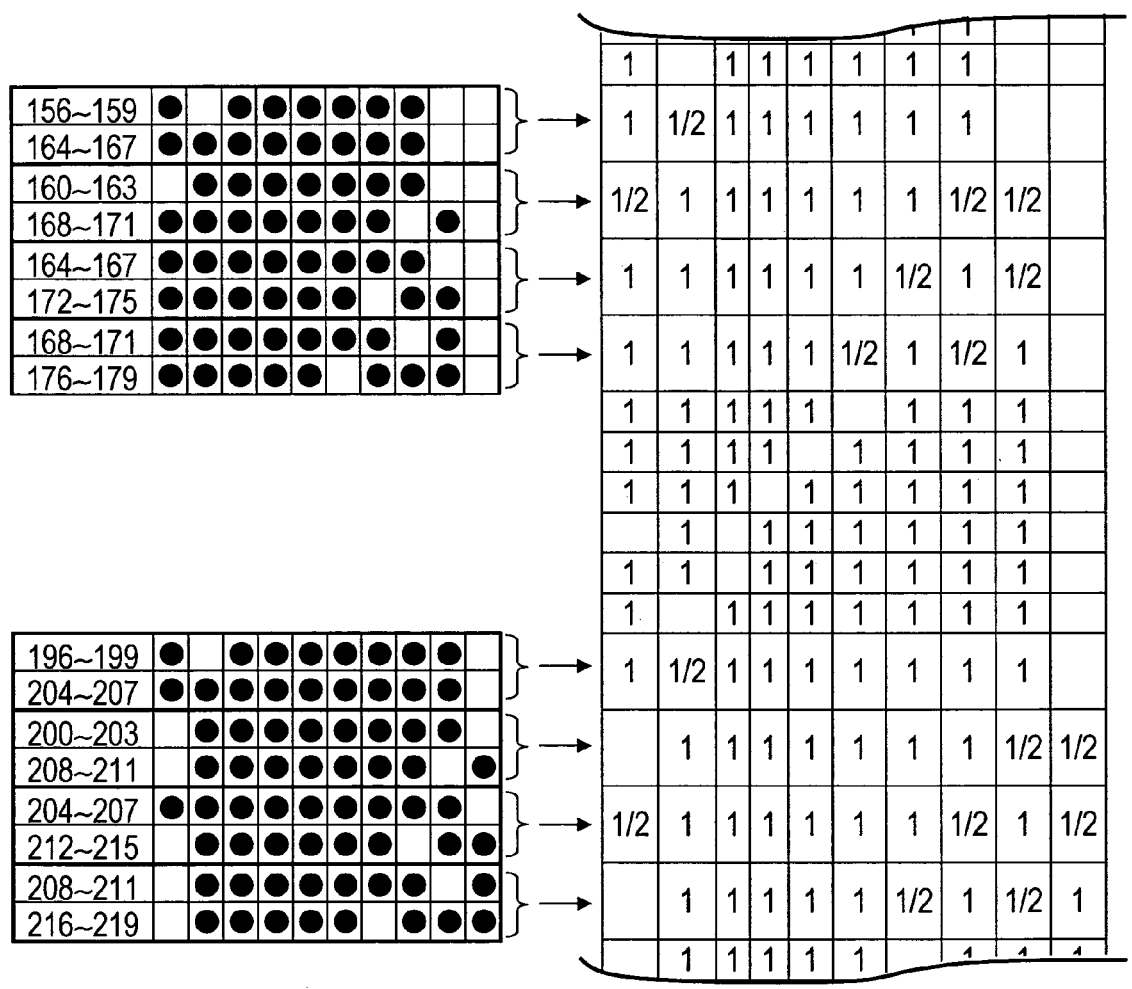
FIG. 12 shows average lighting probabilities of respective sub-fields with respect to respective grayscales for the image display device used in exemplary embodiment 3 of the present invention.

However, compensation values are not added to grayscales ranging from "176" to "199" where the highest intermediate non-lit SF has a relatively low WB to avoid excess compensation for the grayscale. Here, FIG. 12A is identical to FIG. 11B.

As mentioned above, the image display device used in exemplary embodiment 3 can be an effective method when relatively mild compensation is required or excess compensation should be avoided because the compensation is restricted only for the surroundings of the grayscale having the highest intermediate non-lit SFs. Additionally, a specially designed block diagram of a circuit may be implemented for grayscale compensator of the image display device used in exemplary embodiment 3, but the block diagram of the circuit shown in FIG. 2 can also be used for the purpose with the value setting of −m=0 and +m=0 for the grayscales that need no compensation.

Exemplary Embodiment 4

The concept of the image display device in exemplary embodiment 4 is used to exclusively compensate grayscales which include intermediate non-lit SFs with a high weighed brightness (WB) or to exclusively compensate the surrounding grayscales where a lit SF with the highest WB which shifts up to a higher order SF. This type of compensation is identical to the concept of exemplary embodiment 3. Different from exemplary embodiment 3, however, the grayscale compensator distributes the highest intermediate non-lit SF to a broader range than in exemplary embodiment 3 with higher lighting probabilities for the SF to suppress the dynamic false contour effectively.

FIG. 13 shows the compensation patterns for the grayscale compensator used in exemplary embodiment 4, FIG. 13A shows the relation between grayscales before compensation and lighting SFs, and FIG. 13B shows the relation between grayscales after compensation and lighting SFs.

Figures 14A, 14B:
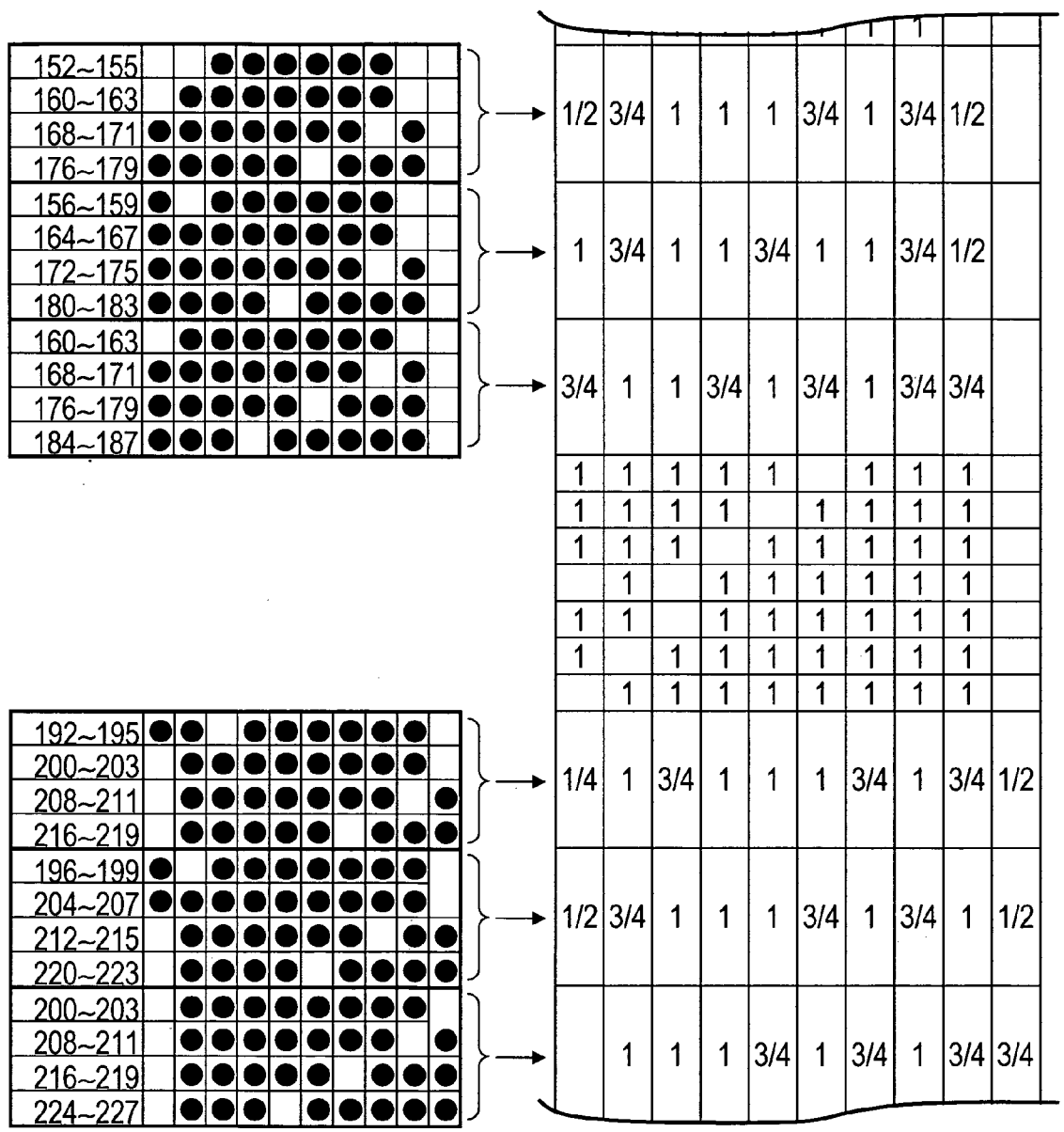
FIG. 14 shows average lighting probabilities of respective sub-fields with respect to respective grayscales for the image display device used in exemplary embodiment 4 of the present invention.

Grayscales in three columns including grayscales "168" and "208" are compensated in this case. One grayscale is distributed to four compensated grayscales using four compensation values of −m2, −m1, +m1 and +m2. FIG. 14B shows the average lighting probabilities of respective SFs with respect to respective grayscales. It is shown in FIG. 14B clearly that the intermediate non-lit SFs and the intermediate lit SF with the highest weighed brightness (WB) are distributed to a broader range than in FIG. 12B. Grayscales ranging from "176" to "199" are not compensated. Here, FIG. 14A is the same drawing as FIG. 13B.

A special block diagram of a circuit may be implemented for the grayscale compensator of the image display device used in exemplary embodiment 4, but the block diagram of the circuit shown in FIG. 8 can be used for the same purpose with the value setting of −m2=0, −m1=0, +m1=0 and +m1=0 for the grayscales that needs no compensation.

Exemplary Embodiment 5

Figure 15:
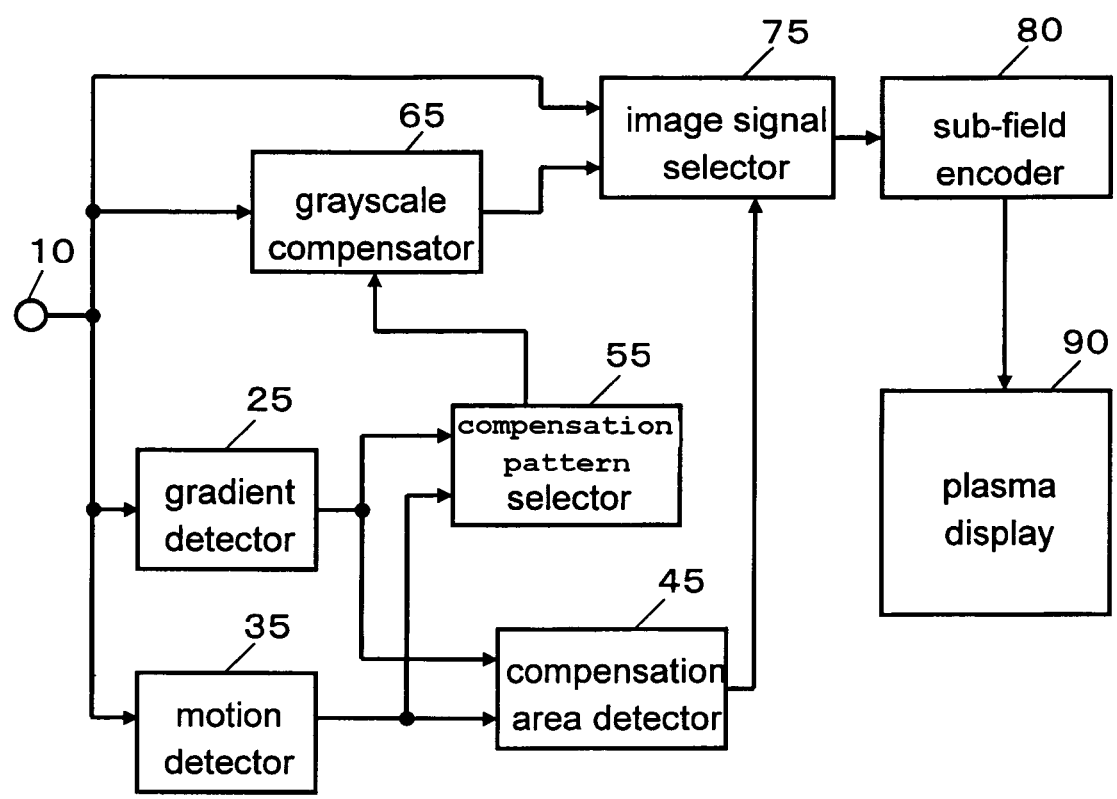
FIG. 15 shows a block diagram of a circuit for the image display device used in exemplary embodiment 5 of the present invention.

FIG. 15 shows a block diagram of a circuit for the image display device used in exemplary embodiment 5. Gradient detector 25 of exemplary embodiment 5 detects not only the presence of gradients but also the amplitude and direction of the gradients, and motion detector 35 detects not only the presence of motions but also the amplitude and direction of the motions. Compensation pattern selector 55 determines the compensation patterns according to the amplitude and direction of the gradients, and according to the amplitude and direction of the motions. Grayscale compensator 65 selects compensation pattern among a plurality of holding patterns. Image signal selector 75 selects compensation image signal in the compensation area and selects image signal 10 in the other area. In exemplary embodiment 5, four compensation patterns used in exemplary embodiments 1 to 4, as shown in FIGS. 6, 9, 11 and 13 are selected according to the amplitude and direction of the gradients, and according to the amplitude and direction of the motions.

The aspects of respective four compensation patterns used here are explained again. The compensation pattern shown in FIG. 6 (pattern 1) compensates the grayscale having intermediate non-lit SFs by distributing the highest intermediate non-lit SF to the surrounding SFs. The compensation pattern shown in FIG. 9 (pattern 2) compensates the same grayscale as the case of pattern 1, but can suppress the dynamic false contour more effectively due to a broader distribution range than pattern 1. The compensation pattern shown in FIG. 11 (pattern 3) exclusively compensates the grayscales including intermediate non-lit SFs with a high weighed brightness (WB) or exclusively compensates the grayscales including intermediate non-lit SFs at the surrounding of the grayscales where a lit SF with the highest WB which shifts up to a higher order SF or to distribute the highest lit SF.

The compensation pattern shown in FIG. 13 (pattern 4) compensates the same grayscale as the case of pattern 3, but can suppress the dynamic false contour more effectively due to a broader distribution range than pattern 3.

FIG. 16 shows the relation between compensation patterns determined by compensation pattern selector 55 and the amplitudes of gradient with respect to the motion directions in exemplary embodiment 5. Small gradient amplitude and motion for low grayscale direction selects pattern 1. Large gradient amplitude and motion for low grayscale direction selects pattern 2. Small gradient amplitude and motion for high grayscale direction selects pattern 3. Large gradient amplitude and motion for high grayscale direction selects pattern 4. Additionally, the dynamic false contour seldomly occurs when the grayscale gradient is very small; and the image is hardly perceived with an uncomfortable feeling when the grayscale gradient is very large, even if the dynamic false contour occurs. FIG. 16, therefore, does not mention such instances.

Next, the relation between the dynamic false contour and gradient direction and motion direction is explained, and a way of determining the compensation patterns is explained.

With reference to FIG. 5A, an example is explained that a moving image to the left direction with a grayscale gradient area having grayscales ranging approximately from "164" to "184" showing a darker shaded area in the left hand side and a lighter shaded area in the right hand side will create a perceivable strong dark line in the grayscale gradient area. This is because the human visual perception, during movements to the left hand side tracing the gradient area, traces the highest intermediate non-lit SF at the points indicated by arrow A in FIG. 4. Therefore, in the case when grayscale gradient area moves to the direction of lower grayscale, compensation to distribute the highest intermediate non-lit SF, that corresponds to pattern 1 or pattern 2 is required. In the case of a large grayscale gradient, pattern 2, which can effectively suppress the dynamic false contour, is selected.

On the other hand, let us assume the case when the gradient area shown in FIG. 5A moves to the right direction. A dark line is not perceived because human visual perception moves in the right direction tracing the gradient area as well. However, as indicated by arrow B in FIG. 4, a bright line with a high brightness is recognized in a grayscale including intermediate non-lit SF with a high WB, or in a grayscale in which lit SF with the highest WB that shifts up to a higher order SF. In this case, the grayscale should preferably be compensated only in the surrounding of the grayscale gradient area to distribute the bright line. Therefore, when the grayscale gradient area moves to the direction of higher grayscale side, exclusive compensation for a grayscale including an intermediate non-lit SF with the highest WB or surrounding grayscales of a grayscale including lit SF with the highest WB that shifts up to a higher order SF, namely pattern 3 or pattern 4, will be sufficient. A grayscale with a large gradient will utilize pattern 4 for compensation to effectively suppress the dynamic false contour.

As mentioned above, noticing that the amplitude of the grayscale gradient and the direction of motion have an influence on perception of the dynamic false contour, the image display device disclosed in exemplary embodiment 5 detects the area where the dynamic false contour is likely to occur in order to compensate the grayscale most suitably according to the amplitude or property of the dynamic false contour. Accordingly, the image display device can suppress the dynamic false contour effectively without any excessive compensation on moving images while grayscale is not compensated in the area where the dynamic false contour will not occur. Consequently, nice image display can be performed for both moving and stationary images.

Figure 17:
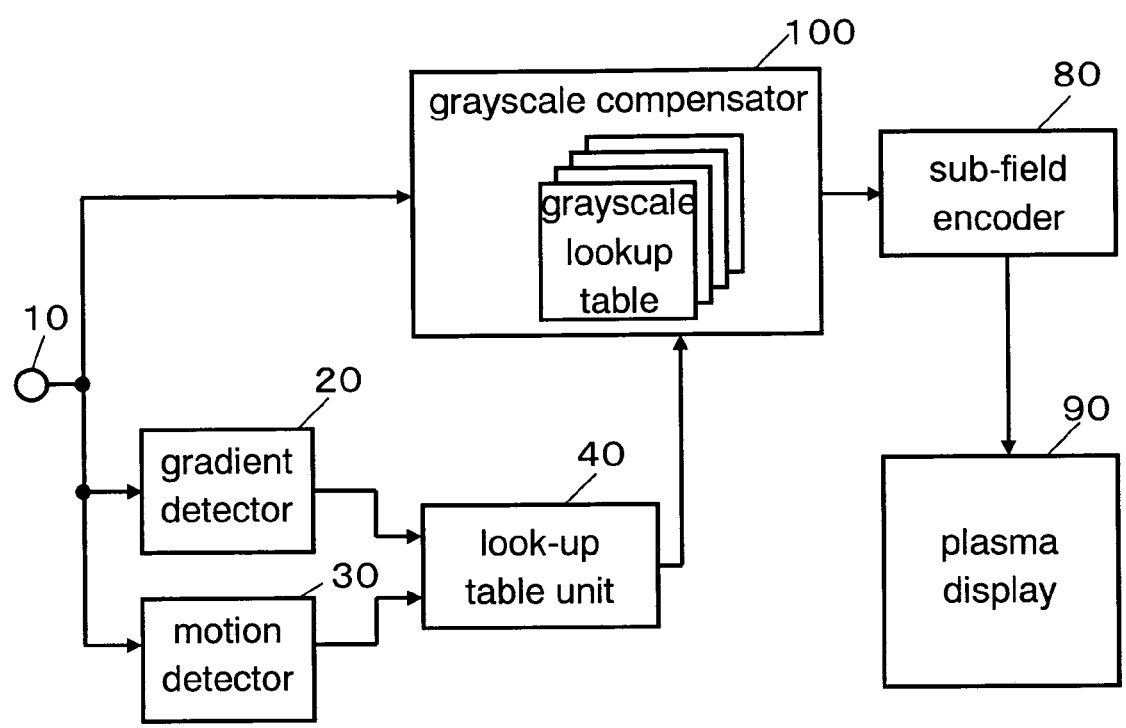
FIG. 17 shows another block diagram of a circuit for the image display device used in exemplary embodiments 1 to 5 of the present invention.

Additionally, although block diagrams of the circuits shown in FIGS. 1, 2, 8 and 15 are explained for image display devices used in exemplary embodiments 1 to 5, the invention is not restricted to the above circuits if the circuitry can provide the compensation pattern operable to distribute the intermediate non-lit SFs. FIG. 17 shows an example of another block diagram of circuit for the image display device used in exemplary embodiments 1 to 5. Grayscale compensator 100 comprises a plurality of grayscale lookup tables to convert the grayscale of image signal 10 to the compensated grayscale using one of the grayscale lookup tables. Gradient detector 20 detects grayscale gradient area in image signal 10, and detects the amplitude and direction of the gradient. Motion detector 30 detects moving areas in image signal 10, and detects the amplitude and direction of the motion. Lookup table unit 40 determines the grayscale lookup table to be used by grayscale compensator 100 according to the outputs of gradient detector 20 and motion detector 30.

If the block diagram of the circuit is used for instance as a circuit for the image display device in exemplary embodiment 1, grayscale compensator 100 needs three kinds of grayscale lookup tables. The respective lookup tables must be configured to output the compensated grayscales of added with −m, with +m and with nothing to the input image signal grayscales respectively. The grayscales can be compensated using grayscale lookup tables added with −m or +m in the compensation area, and using grayscale lookup table added with nothing from the outside of the compensation area.

When the block diagram of the circuit is used as a circuit for the image display device in exemplary embodiment 5, the grayscale can be compensated using one lookup table units selected from a total of 13 lookup tables including 12 lookup tables derived from 4 compensation patterns and one lookup table for no compensation.

Although sub-field (SF) configuration shown in FIGS. 3 and 4 are explained in exemplary embodiment 1 to 5, the dynamic false contour can be equally suppressed by grayscale compensation to distribute the intermediate non-lit SF, also in case of using other SF configuration comprising a different number or weighed brightness (WB) and the like.

Additionally, the motion detector does not require a motion vector, but can operate by utilizing the time subtraction of the image signal and the gradient of grayscale.

INDUSTRIAL APPLICABILITY

The present invention can provide an image display device capable of suppressing the dynamic false contour while maintaining a good grayscale display by detecting the area where the dynamic false contour is likely to occur to compensate the grayscale of the area most suitably without any practical grayscale degradation.

The invention claimed is:

1. An image display device operable to display multiple grayscales, based on an input image signal, by controlling each sub-field of a plurality of sub-fields composing each field to be lit or not lit, said image display device comprising:

a gradient detector operable to detect an area having a grayscale gradient within the image signal, and operable to detect the amplitude and the direction of the area having the grayscale gradient;

a motion detector operable to detect an area having motion within the image signal, and operable to detect the amplitude and the direction of the area having the motion; and a grayscale compensator operable to compensate a plurality of predetermined grayscale gradients within the image signal, wherein:

said grayscale compensator is operable to identify at least one of the plurality of predetermined grayscale gradients to be compensated, and said grayscale compensator is operable to select at least one of the plurality of compensation grayscale gradients according to the amplitude and the direction of the grayscale gradient detected by said gradient detector and according to the amplitude and the direction of the motion detected by said motion detector.

2. The image display device according to claim 1, wherein at least one of the plurality of compensation grayscale gradients is operable to light a non-lit sub-field, containing a highest weighed brightness among non-lit sub-fields, with a weighed brightness lower than that of lit sub-fields within grayscale gradients to be compensated.

3. The image display device according to claim 2, wherein the average values of the plurality of the compensated grayscale gradients are identical to the average values of the grayscale gradients prior to compensation.

4. The image display device according to claim 1, wherein:

the number of the predetermined grayscale gradients to be compensated, when the area with the grayscale gradient is moving in a direction of a higher grayscale, is less than, the number of the predetermined grayscale gradients to be compensated, when the area with the grayscale gradient is moving in a direction of a lower grayscale.

5. An image display device operable to display multiple grayscales, based on an input image signal, by controlling each sub-field of a plurality of sub-fields composing each field to be lit or not lit, said image display device comprising:

a grayscale compensator operable to compensate a plurality of predetermined grayscales within the image signal, wherein:

said grayscale compensator is operable to identify at least one the a plurality of predetermined grayscale gradients to be compensated, and said grayscale compensator is operable to select one of a plurality of compensation grayscale gradients according to the predetermined grayscale gradient to be compensated, wherein at least one of the plurality of compensation grayscale gradients is operable to light a non-lit sub-field containing a highest weighed brightness among non-lit sub-fields, with a weighed brightness lower than that of lit sub-fields within predetermined grayscale gradients to be compensated.

6. The image display device according to claim 5, wherein the average values of the plurality of the compensated grayscale gradients are identical to the average values of the grayscale gradients prior to compensation.

7. An image display device operable to display multiple grayscales, based on an input image signal, by controlling each sub-field of a plurality of sub-fields composing each field to be lit or not lit, said image display device comprising:

a gradient detector operable to detect an area having a grayscale gradient within the image signal;

a motion detector operable to detect an area having motion within the image signal; and a grayscale compensator operable to compensate the grayscale gradient in the area having motion detected by said gradient detector and said motion detector, wherein:

said grayscale compensator is operable to identify at least one of a plurality of predetermined grayscale gradients to be compensated according to the grayscale gradient having motion detected by said gradient detector and said motion detector, and said grayscale compensator is operable to select one of a plurality of compensation grayscale gradients according to the predetermined grayscale gradient to be compensated, wherein at least one of the plurality of compensation grayscale gradients is operable to light a non-lit sub-field containing a highest weighed brightness among non-lit sub-fields, with a weighed brightness lower than that of lit sub-fields within predetermined grayscale gradients to be compensated.

8. The image display device according to claim 7, wherein the average values of the plurality of the compensated grayscale gradients are identical to the average values of the grayscale gradients prior to compensation.

\* \* \* \* \*